June 24, 1958     R. H. STEIDL     2,840,259
FABRIC SLOSH BULKHEAD
Filed Sept. 6, 1955

INVENTOR.
ROBERT H. STEIDL
BY
Reynolds, Beach & Christensen
ATTORNEYS

2,840,259

FABRIC SLOSH BULKHEAD

Robert H. Steidl, Seattle, Wash., assignor to Boeing Airplane Company, Seattle, Wash., a corporation of Delaware Application September 6, 1955, Serial No. 532,607

2 Claims. (Cl. 220—22)

Rigid slosh bulkheads of metal or the like are commonly used in vehicle fuel tanks in order to impede the accelerative and decelerative movement of the liquid contents of the tank (gasoline or the like) from one end of the tank to the other under the influence of forces of acceleration or deceleration of the vehicle, such as an airplane. It has also been proposed to employ bulkheads which are rigid but somewhat porous, in order to create a pressure drop as between the opposite faces of the bulkhead, and so to absorb the energy created by the movement of the liquid contents.

Either of these types of bulkhead completely absorbs and does not store up the energy produced by sloshing, nor restore it in the form of a counteracting force on the liquid, and when the direction of the sloshing movement reverses, as it does with deceleration, further energy must be absorbed in the opposite sense. The tank structure is under constant stress arising from accelerative and decelerative forces, causing continual sloshing.

According to the present invention, a slosh bulkhead in such an installation is made of a material which, in addition to being somewhat porous, is also somewhat elastic, rather than rigid or semi-rigid. Thereby, as sloshing occurs, its energy is converted into elastic deformation of the bulkhead, yet with a certain amount of porosity permitting the liquid to spill through in some measure, and then when the causative accelerating force lessens, prior to reversal of the direction of forces acting upon the sloshing liquid, the elastic energy is returned gradually to the liquid, slowing it down and displacing it to its initial position, and the bulkhead returns to its initial unstressed condition, ready again to absorb energy elastically upon the occurrence of a further accelerative or decelerative force, but not itself causing any such force. As a result, shocks upon the tank structure are greatly lessened, and actual displacement of the liquid contents is kept within a relatively narrow range, with the further result that the inertia forces are considerably lessened in value.

The present invention will find its greatest field of usefulness in connection with airplane fuel tanks, particularly of the droppable type, and is shown in conjunction with such a tank. It is to be understood, however, that its use is not confined to this particular type of tank, nor to use only on airplanes. It might be used in tanks which contain other liquids, suitable modification being made, if necessary, for any change in the viscosity of the liquid contents of the tank, which are being controlled.

The general nature of the invention and its objects will be understood sufficiently from the above. The invention is shown embodied in a representative form in the accompanying drawings.

Figure 1:
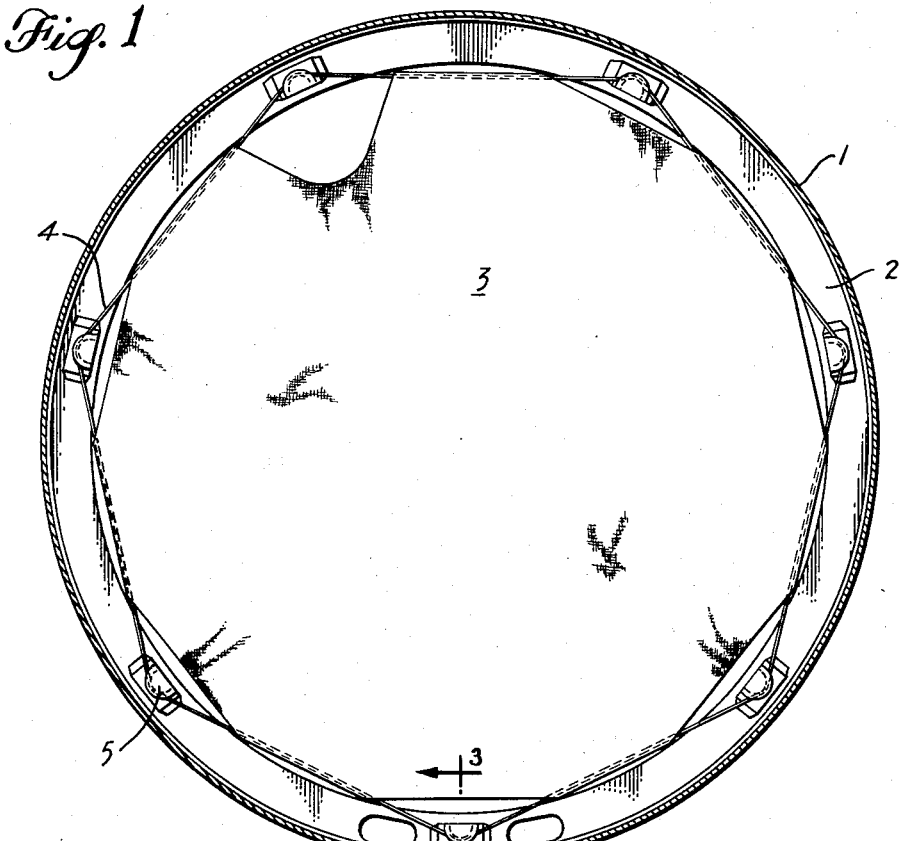
Figure 1 is a transverse sectional view through a tank of the nature referred to above, illustrating the slosh bulkhead of the present invention installed therein.

The tank 1 is representative of any form or shape of tank, but particularly represents a droppable airplane fuel tank of substantially circular cross-section and elongated streamlined form. The tank-supporting and releasing means have been omitted, since their inclusion would add nothing to the understanding of the present invention. Such a tank is provided internally with circular ribs or stiffeners 2 at intervals in its length, and may be otherwise strengthened. With the particular nature of such details, the present invention is not concerned.

At suitable intervals in the length of the tank, slosh bulkheads of the present invention are disposed transversely of the tank, and consist, according to the present invention, of sheets 3 of a fabric material, preferably woven nylon, but in any event material which has inherent resilient elasticity. Nylon strands are inherently elastic, and are not harmed by immersion in gasoline. Such a sheet 3 is provided of the approximate shape and size of the interior of the tank at the location where it is to be installed. Means are provided for supporting each sheet in this planar disposition, such means conveniently comprising a substantially inelastic cable 4, of steel or other suitable material, which extends about the periphery of the sheet 3 and is engaged therewith at intervals. For example, the peripheral edges of the sheet 3 may be turned back and seamed to provide tunnels for the reception of the cable 4.

At intervals the cable is supported by suitable means from the tank. Such supporting means may take any of a variety of forms, consisting, as shown, of the hooks or fair-leads 5, which are secured, for instance, to the circular rib 2 and about which the cable 4 is extended. The cable is preferably drawn taut about the guiding means at 5, not necessarily with the aim of stretching the sheet 3, but of maintaining the same reasonably taut and planar.

The manner of forming the sheet and of supporting it thus upon the cable 4 insures the leaving of sufficient space about the edges of the sheet for some movement of liquid to occur, and for proper drainage from all parts of the tank to its outlet. The space thus left, however, is insufficient to permit appreciable abrupt displacement such as occurs during sloshing.

Figure 2:
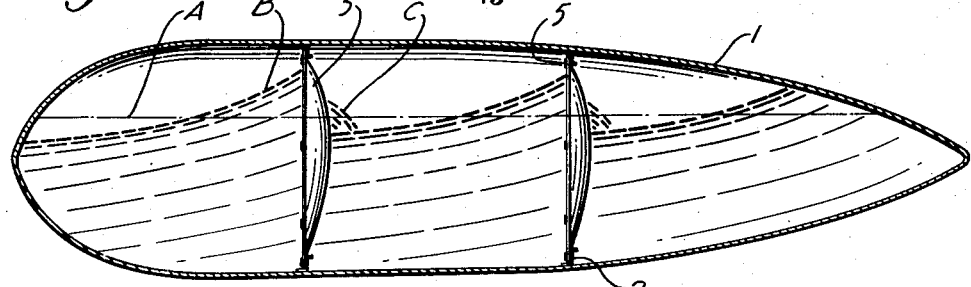
Figure 2 is a general longitudinal section through such a tank with two such bulkheads installed, and illustrating the effect thereof during sloshing.
Figure 3:
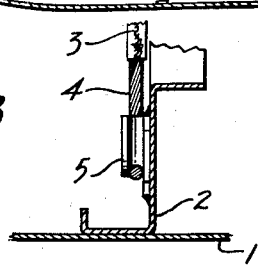
Figure 3 is a detail section at 3—3 of Figure 1, to an enlarged scale.

It has been attempted in Figure 2 to illustrate the result of rapid acceleration towards the left. When this occurs, the liquid level, which under static conditions might be at the line A, tends to tilt somewhat as shown at B, as the mass of liquid as a whole tends to move to the rear of the tank, or in Figure 2 to the right. There being several bulkheads 3 of the nature described above interposed transversely of the tank at intervals in its length, the liquid to the left or ahead of each such bulkhead, upon encountering the same will impose a force upon it. Since the bulkhead is to some degree porous, a certain amount of the liquid will pass through the bulkhead and spill out at the opposite side as indicated at C in Figure 2, but the main body of liquid ahead of the bulkhead will not be able to pass through nor around it, but will impose the forces of acceleration upon the bulkhead as a whole. The bulkhead being woven of material the strands whereof are inherently elastic and resilient, will yield or belly out to the right, as seen in Figure 2, acting like a spring. If there are several such bulkheads spaced fairly closely together, there is no cumulative force of acceleration built up to an extent to impose a large total force on any given bulkhead. Now, as the accelerative force decreases, and before there is a decelerative force, the energy stored up in the elastic bulkhead 3 begins to restore the bulkhead to its initial planar condition urging the mass of liquid ahead of it back to its initial position, or to the left, in Figure 2. In this way, by the resiliently elastic action of the bulkhead, serving as a spring upon release of a compressive force, the liquid is gently and somewhat gradually returned approximately to its initial condition, and if the deceleration is gradual enough, there is no large sloshing effect beyond the initial sloshing due to initial acceleration. Minor sloshing movements are again absorbed during flight by the elasticity and resilience of the bulkhead, with the result that the tank structure is not subjected to the forces such as are continually being applied to fixed rigid bulkheads.

I claim as my invention:

1. In combination with an airplane fuel tank or the like, a sheet of textile material composed principally of strands which have inherent resilient elasticity disposed within said tank, in a plane transverse to expected sloshing movement of the liquid contents, and of a size and shape, when unstressed, approximating those of the tank at the sheet's location, supporting means distributed about the tank, in the plane common to the plane of the sheet, and a substantially inelastic cable surrounding and engaged at intervals with the periphery of the sheet, and engaging the tank-mounted supporting means, to retain the sheet stretched in its plane.

2. In combination with an airplane fuel tank or the like, a sheet of nylon fabric disposed within said tank, in a plane transverse to expected sloshing movement of the liquid contents, and of a size and shape approximating those of the tank at the sheet's location, a cable of substantially inelastic material extending about and secured at intervals to the periphery of said sheet, and cable guides secured to the tank, at angular intervals in the plane of the sheet, the cable being held taut by engagement with said cable guides, and thereby holding the sheet in planar disposition while the liquid is quiescent.

References Cited in the file of this patent

UNITED STATES PATENTS

| | | |
|---|---|---|
| 2,355,084 | Kurrle | Aug. 8, 1944 |
| 2,378,606 | Watson | June 19, 1945 |
| 2,609,118 | Cattaneo | Sept. 2, 1952 |

FOREIGN PATENTS

| | | |
|---|---|---|
| 15,467 | Great Britain | 1902 |
| 932,322 | France | Nov. 24, 1947 |